(No Model.)
H. ROESKE.
FILTER.
No. 348,534. Patented Aug. 31, 1886.
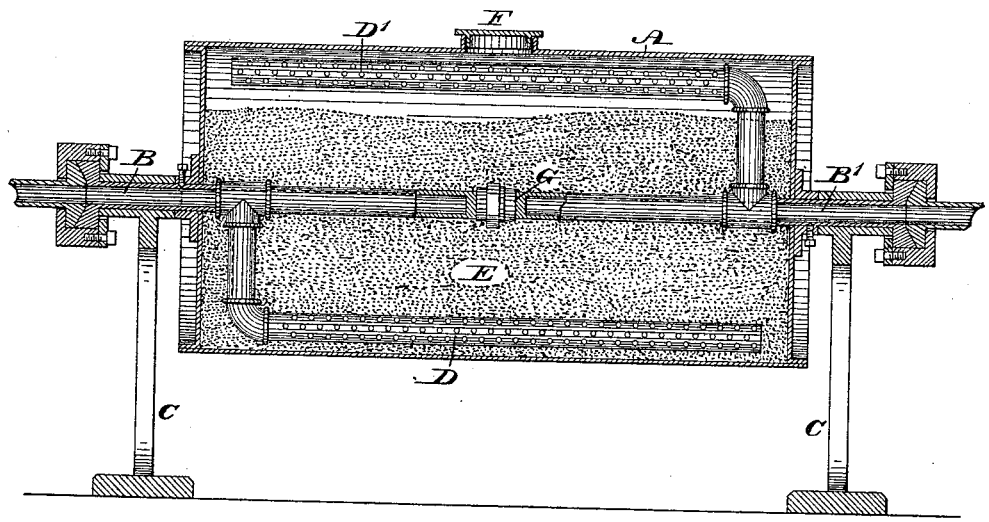
WITNESSES:
INVENTOR: Henry Roeske,
BY _____ ATTORNEY.

United States Patent Office.

HENRY ROESKE, OF PHILADELPHIA, PENNSYLVANIA, ASSIGNOR OF ONE-HALF TO MANOEL J. NASCIMENTO, OF SAME PLACE.

FILTER.

SPECIFICATION forming part of Letters Patent No. 348,534, dated August 31, 1886.

Application filed June 18, 1885. Serial No. 169,055. (No model.)

*To all whom it may concern:*

Be it known that I, HENRY ROESKE, a citizen of the United States, residing in the city and county of Philadelphia, State of Pennsylvania, have invented a new and useful Improvement in Filters, which improvement is fully set forth in the following specification and accompanying drawings, in which the figure represents a longitudinal section of a filter embodying my invention, the object whereof is to provide a large-filtering surface for the fluid and adapt the filter to be rotated, in order to agitate the filtering material, so as to loosen and refresh the same should it have packed and clogged, &c.

Referring to the drawing, A represents a cylindrical or other shaped vessel to whose sides are connected horizontally-extending pipes B B', which latter are properly mounted on standards or other supports C, and constitute the inlet and outlet of the vessel, it being noticed that the vessel is rotatable with the pipes B B'. Within the vessel at what may be termed the "top and bottom" thereof are elbow-pipes D D', separate from each other, the vertical limbs of each of which are secured to the inner ends of the pipes B B', respectively, and in communication therewith, and the horizontal limbs thereof being perforated, in order to be in communication with the vessel A. The vessel is supplied with suitable filtering material, E, and provided with a stoppered nozzle, F, for the admission and removal of said material when so required.

When water or other fluid enters the pipe B from a supply-pipe which is in communication with said pipe B, it is directed into the pipe D, and, escaping through the perforated limb thereof, passes through the material E, whereby it is filtered, and so admitted into the pipe D', whence it is discharged through the pipe B', and so directed to the place of service, it being noticed that the fluid has passed a large filtering surface or space, and is reliably filtered in its passage from one pipe, D, to the pipe, D', it being evident that the inlet and outlet pipes may be reversed, so that the unfiltered fluid enters the pipe D' and is admitted filtered into the pipe D.

Should the filtering material become clogged, packed, or matted the vessel A is rotated, thus agitating said material, whereby it is loosened and refreshed, and the impurities may be removed with the water through the pipe D' and outlet-pipe B', or through the nozzle F, the latter being opened or uncovered. The rotation of the vessel being effected, the pipes D D' change position, and the direction of the passage of the water from pipe to pipe is reversed. The impurities or sediment in either of said pipes which primarily received the fluid may now be washed out and conveyed through the other pipe, and thus discharged, provision being thereby made for preventing said pipes from being clogged or retaining the impurities. For purposes of strength the pipes D D' are connected by pipes or rods coupled as at G.

Having thus described my invention, what I claim as new, and desire to secure by Letters Patent, is—

1. In a filter, the drum A, having the pipes B and B', entering the said drum on the opposite ends thereof, and having their inner closed ends securely fastened together, and the perforated elbow-pipes D and D' within said drum and leading from said pipes B and B', all of said parts arranged, combined, and operating substantially as described.

2. The drum A, having filtering material loosely placed therein, in combination with the pipes B and B', connected at their inner closed ends, and provided with the perforated elbow-pipes D and D', respectively, and standards C, having bearings for said pipes B and B', all of said parts being arranged, combined, and operating substantially as and for the purpose set forth.

3. The rotatable drum A, provided with the inlet and outlet pipes B and B' at opposite ends, the said pipes having their inner closed ends connected and their outer ends forming journals for the said drum with bearings in the standards C, the said drum having within the same filtering material, the perforated elbow-pipes D and D', connected to said inlet and outlet pipes, all of said parts being arranged, combined, and operating substantially as and for the purpose set forth.

HENRY ROESKE.

Witnesses:
 JOHN A. WIEDERSHEIM,
 A. P. GRANT.